(12) United States Patent
Guo et al.

(10) Patent No.: US 7,612,968 B1
(45) Date of Patent: Nov. 3, 2009

(54) DISK DRIVE MICROACTUATOR FRAME WITH EPOXY OVERFLOW RESERVOIR

(75) Inventors: Wei Guo, Fremont, CA (US); Lin Guo, Saratoga, CA (US)

(73) Assignee: Maxtor Corporation, Scotts Valley, CA (US)

(*) Notice: Subject to any disclaimer, the term of this patent is extended or adjusted under 35 U.S.C. 154(b) by 856 days.

(21) Appl. No.: 11/230,215

(22) Filed: Sep. 19, 2005

Related U.S. Application Data

(60) Provisional application No. 60/632,383, filed on Dec. 2, 2004.

(51) Int. Cl.
*G11B 5/56* (2006.01)
(52) U.S. Cl. .................................... 360/294.4
(58) Field of Classification Search ............... 360/294.4
See application file for complete search history.

(56) References Cited

U.S. PATENT DOCUMENTS

| | | | | |
|---|---|---|---|---|
| 6,934,127 B2* | 8/2005 | Yao et al. ................. | 360/294.4 |
| 7,221,542 B2* | 5/2007 | Yao et al. ................. | 360/294.3 |
| 7,359,154 B2* | 4/2008 | Yao et al. ................. | 360/234.6 |
| 7,433,159 B2* | 10/2008 | Yao et al. ................. | 360/294.4 |
| 2003/0147177 A1 | 8/2003 | Yao et al. ................. | 360/244.7 |
| 2003/0147181 A1* | 8/2003 | Shiraishi et al. .......... | 360/294.4 |
| 2004/0095688 A1* | 5/2004 | Shiraishi et al. .......... | 360/294.4 |
| 2005/0152072 A1* | 7/2005 | Kwon et al. ............. | 360/294.4 |

* cited by examiner

*Primary Examiner*—Angel A. Castro

(57) ABSTRACT

A disk drive slider positioner (180) includes a frame (184) having a pair of arms (216a, 216b) that cantilever from a base (188). A slider (140) is positioned within frame (184). A pair of slots (224a, 224b) extend down through the frame (184) and also extend along part of the corresponding arm (216a, 216b). Each slot (224a, 224b) includes a corresponding first slot section (228a, 228b) and a wider corresponding second slot section (232a, 232b). A material (240) that is more pliable than the frame (184) preferably occupies the entire length of each first slot section (228a, 228b). Excess first material (240) may overflow into the corresponding wider second slot section (232a, 232b), thereby reducing the potential for excess first material (240) occupying any portion of the space between a leading edge (144) of the slider (140) and the frame (188).

30 Claims, 7 Drawing Sheets

DISK DRIVE MICROACTUATOR FRAME WITH EPOXY OVERFLOW RESERVOIR

CROSS-REFERENCE TO RELATED APPLICATIONS

This patent application claims priority under 35 U.S.C. §119(e) to U.S. Provisional Patent Application Ser. No. 60/632,383, that was filed on Dec. 2, 2004, that is entitled "MICROACTUATOR U-FRAME CORNER SLOT SHAPE OPTIMIZATION FOR EPOXY FILLING," and the entire disclosure of which is hereby incorporated by reference herein.

FIELD OF THE INVENTION

The present generally relates to the field of microactuators for positioning the read/write head of a disk drive slider and, more particularly, to incorporating an overflow reservoir for when epoxy is deposited in a pair of slots formed in the frame of the microactuator.

BACKGROUND OF THE INVENTION

Disk drives may use a single stage actuator for positioning the read/write head of a particular slider relative to the desired track of the corresponding data storage disk. One common way to provide this single stage positioning is through the voice coil motor. Dual stage positioning approaches are at least being considered in the disk drive industry. Such a dual stage approach may use both the voice coil motor (e.g., a first stage actuator), as well as what is commonly referred to in the art as a microactuator or a slider positioner (e.g., a second stage actuator) that is typically mounted on a deflectable flexure tongue. This microactuator may be in the form of a U-shaped frame having a base and a pair of deflectable arms that each cantilever from the base. The slider is disposed between these arms in spaced relation to each arm and the base. A "spot" of epoxy attaches the slider to each of the arms. One or more actuating elements (e.g., multi-layer piezoelectric structures) are mounted on the flexure tongue and engage the outside of each of the arms. Activation of the piezoelectric elements(s) associated with one of the arms will exert a force on the corresponding arm that deflects at least this arm, and thereby changes the position of the slider and its read/write head.

The microactuator frame may be made from a relatively brittle material, for instance a ceramic. A slot may be formed in the frame adjacent to each arm and filled with an appropriate epoxy to reduce the stresses that are concentrated at these two corners and also to structurally reinforce the frame. It is difficult to fill these slots to the appropriate level, which adversely affects the yield of the microactuator/slider assembly. Under-filling either slot may not sufficiently reduce the potential for cracking of the microactuator frame at the junction of an arm with the base, either during operation of one or both of the piezoelectric elements or as a result of exposure to a shock event. Over-filling of either slot may result in epoxy being disposed on the distal end of the portion of the base that is disposed between the two deflectable arms. This may present a clearance issue when the slider is disposed in the space between the arms and the base. That is, typically there is only a small gap between the slider and the portion of the base that is disposed between the arms. Having epoxy in this gap may adversely affect the ability to dispose the slider in the correct position, the movement of the slider by the microactuator, or both.

BRIEF SUMMARY OF THE INVENTION

A first aspect of the present invention is directed to a disk drive slider positioner or actuator (e.g., a second stage actuator) that includes a frame, as well as first and second actuating elements. Sometimes such a positioner or actuator is referred to in the art as a "microactuator." In any case, the frame is in the form of a base having first and second base sections. A pair of arms (hereafter first and second arms) are spaced along the first base section and cantilever from this first base section. The second base section is located between and spaced inwardly from the first and second arms to define first and second slots, respectively. That is, the first slot exists between the first arm and second base section, while the second slot exists between the second arm and the second base section. The width of each of the first slot and the second slot is different at least at two different locations along the length of the corresponding slot. Stated another way, the first slot has at least two different widths along its length, as does the second slot. A first material is disposed within at least part of both the first slot and the second slot. The noted first actuating element is associated with the first arm, while the noted second actuating element is associated with the second arm.

Various refinements exist of the features noted in relation to the first aspect of the present invention. Further features may also be incorporated in the first aspect of the present invention as well. These refinements and additional features may exist individually or in any combination. The characterization of the first and second slots presented by the first aspect (e.g., having one part of both the first and second slots being wider than another part of the first and second slots that is at a different location in the length dimension, as opposed to just having two different widths at the same location in the length dimension) provides an overflow feature of sorts when positioning the first material within each of the first and second slots. For instance, it may be desirable to completely "fill" the "narrower" portion of the first and second slots, with any excess first material thereafter occupying part of the "wider" portion of the first and second slots. The first and second slots may each include two or more length segments of different widths. Generally, having first and second slots formed in the base and having the first material in these slots should reduce stresses that are concentrated at the interconnection of the first and second arms with the first base section and should also structurally reinforce the frame.

The first material may be positioned within the first and second slots in any appropriate manner, with the frame in any appropriate position, and at any appropriate time in the fabrication/assembly of a disk drive head-gimbal assembly or the individual components thereof. In order for the first material within the first and second slots to desirably reduce the stress concentrations associated with the corner between the arms and base of the frame, the first material should generally be more pliable than the frame, for instance in the form of an epoxy or other adhesive materials. Stated another way, the first material should have one or more of the following properties: the ability to bond to the frame; a Young's module of elasticity that is less than that of the frame; a glass transition temperature that is higher than the normal operating temperature of the disk drive in which the disk drive slider positioner or actuator will be used.

Typically the first and second slots will extend completely through the entire thickness of the frame and will have the same width through their entire vertical extent. The height or depth dimension of the first and second slots corresponds with the thickness dimension of the frame. The width dimension of the first and second slots corresponds with the spacing between the relevant arm and the second base section. The length dimension of the first and second slots at least generally corresponds with the direction that the first and second arms extend away from the first base section. Although it is preferred for each of the first and second slots to have a constant width in the height or depth dimension, such is not required.

Both the first slot and the second slot may include first and second slot sections that each defines part of the length dimension of the corresponding slot (e.g., the first slot section defines one length segment, while its corresponding second slot section defines a different length segment). Each second slot section may be wider than its corresponding first slot section. The first slot section and its corresponding second slot section may be disposed in end-to-end relation, but in any case each second slot section is preferably closer to a free end of its corresponding arm than its corresponding first slot section. In one embodiment, the width of each first slot section is constant along its length dimension, and the width of each second slot section is constant along its length dimension. Although both first slot sections will typically be of at least substantially the same width and although both second slot sections will typically be at least substantially the same width, such is not required.

Each of the above-noted second slot sections may be viewed as an overflow reservoir for its corresponding first slot section. In one embodiment, the first material occupies the entire length of both first slot sections, and any first material within either of the second slot sections occupies less than the entire length of the relevant second slot section. Therefore, any first material within either of the second slot sections will be spaced back from a distal end of the second base section. In another embodiment, the first material occupies the entire length of both first slot sections, and occupies only a portion of the length of both second slot sections such that the first material again is spaced back from a distal end of the second base section. This not only may be desirable for reducing stress concentrations at the corners between the arms and the base, but the additional first material within each second slot section may provide additional structural reinforcement of the frame.

Both the first slot and second slot may be characterized as having a closed end defined by the first base section and an oppositely disposed open end. The distance between the open and closed ends of the first and second slots coincides with their respective length dimension. The open end of the first slot may be characterized as coinciding with where the first arm progresses beyond a distal end of the second base section or as that end of the first slot that merges with the space that is bounded by the first arm, a distal end of the second base section, and the second arm. Similarly, the open end of the second slot may be characterized as coinciding with where the second arm progresses beyond the distal end of the second base section or as that end of the second slot that merges with the space that is bounded by the second arm, the distal end of the second base section, and the first arm. In one embodiment, the first and second slots are each widest at their open end and are each narrowest at their closed end. In another embodiment, the width of the first slot at its open end is greater than the width of the first slot at its closed end, while the width of the second slot at its open end is greater than the width of the second slot at its closed end.

A slider may be positioned between the first and second arms of the frame. Typically the slider would be spaced inwardly from each arm, and further would be appropriately interconnected with each arm. This slider may include what is commonly referred to as leading and trailing edges. Generally, the relative airflow during disk drive operations is from the leading edge to the trailing edge of the slider, and typically one or more transducers will be disposed at or near the trailing edge of the slider (e.g., a read/write head). In any case, the leading edge of the slider may be spaced from a distal end of the second base section of the frame (again, that portion of the base that is located between the first and second arms), and the leading edge of the slider may be located between the distal end of the second base section of the frame and the trailing edge of the slider. Stated another way, the slider may be oriented in the frame such that its leading edge is slightly spaced from a distal end of the second base section and the trailing edge of the slider may be disposed more toward the free end of the first and second arms of the frame. In one embodiment, the distance between the leading edge of the slider and the distal end of the second base section of the frame is less than a widest portion of each of the first and second slots. In another embodiment, no first material exists within the space between the leading edge of the slider and the distal end of the second base section.

It should be appreciated that the characterization of the base as having first and second base sections does not require the base to be two separate pieces. The base, as well as the first and second arms, will typically be of one-piece construction. However, the frame may be of any suitable construction, and further may be formed from any appropriate material or combination of materials.

Generally, the first and/or second actuating elements may be operated to exert a force on its corresponding arm to change the position of its corresponding arm by deflecting or bending the same (and also change the position of a disk drive slider that may be interconnected with the arms as noted above). The first and second actuating elements may be of any appropriate type, size, shape, and/or configuration. In one embodiment, both the first actuating element and second actuating element are in the form of what may be characterized as a multi-layer piezoelectric element. Although the first and second actuating elements may indeed be the same in all respects, such is not required.

A second aspect of the present invention is directed to a disk drive slider positioner or actuator (e.g., a second stage actuator) that includes a frame, as well as first and second actuating elements. Sometimes such a positioner or actuator is referred to in the art as a "microactuator." In any case, the frame includes a base and a pair of arms (hereafter first and second arms) that cantilever from the base. The base includes what may be characterized as a "base protrusion" that is located between the first and second arms and that includes first and second base protrusion sides. Generally, the first base protrusion side is spaced inwardly from the first arm, while the second base protrusion side is spaced inwardly from the second arm. More specifically, the first base protrusion side includes first and second sections that are spaced inwardly from the first arm by different distances, and that each define a different portion of the length of the first base protrusion side. Similarly, the second base protrusion side includes third and fourth sections that are spaced inwardly from the second arm by different distances, and that each define a different portion of the length of the second base protrusion side. A first material is disposed within at least part of the space between the first arm and the first base protrusion side, and is also disposed within at least part of the space between the second arm and the second base protrusion side. The noted first actuating element is associated with the first arm, while the noted second actuating element is associated with the second arm.

Various refinements exist of the features noted in relation to the second aspect of the present invention. Further features may also be incorporated in the second aspect of the present invention as well. These refinements and additional features may exist individually or in any combination. The characterization of the space between the first arm and the first base protrusion side, and of the spacing between the second arm and the second base protrusion side (e.g., each having at least two different length segments that are spaced inwardly different distances from their corresponding arm) provides an overflow feature of sorts when positioning the first material within each of these spaces. For instance, it may be desirable to completely "fill" a "narrower" portion of the spacing between the first arm and the first base protrusion side, with any excess first material thereafter occupying part of a "wider" portion of the spacing between the first arm and the first base protrusion side. Similarly, it may be desirable to completely "fill" a "narrower" portion of the spacing between the second arm and the second base protrusion side, with any excess first material thereafter occupying part of a "wider" portion of the spacing between the second arm and the second base protrusion side. Generally, having the first and second base protrusion sides spaced inwardly from the first and second arms, respectively, and having the first material in at least part of these two spaces, should reduce stresses that are concentrated at the interconnection of the first and second arms with the base and should also structurally reinforce the frame.

The first material may be positioned within the space between the first arm and the first base protrusion side and within the space between the second arm and the second base protrusion side in any appropriate manner, with the frame in any appropriate position, and at any appropriate time in the fabrication/assembly of a disk drive head-gimbal assembly or the individual components thereof. The discussion of the first material presented above in relation to the first aspect is equally applicable to this second aspect.

The base protrusion (the portion of the base that is located between the first and second arms) may include a distal end that extends between the first and second base protrusion sides. The second section of the first base protrusion side may extend from this distal end at least toward its associated first section (e.g., progressing in the direction of where the first arm interconnects with the base). The second section may be spaced further from the first arm than its corresponding first section (e.g., the spacing between the first arm and the first base protrusion side may be wider at an end of this spacing that is opposite of that where the first arm interconnects with the base). Similarly, the fourth section of the second base protrusion side may extend from this distal end of the base protrusion at least toward its associated third section. The fourth section may be spaced further from the second arm than its corresponding third section (e.g., the spacing between the second arm and the second base protrusion side may be wider at an end of this spacing that is opposite of that where the second arm interconnects with the base). In one embodiment, the distance between the second section of the first base protrusion side and the first arm is at least about twice the distance between the first section of the first base protrusion side and the first arm, and the distance between the fourth section of the second base protrusion side and the second arm is at least about twice the distance between the third section of the second base protrusion side and the second arm. Although the spacing between the arms and their corresponding base protrusion may be constant in the height or depth dimension, such is not required.

Preferably, the first material does not occupy the entire spacing between the first arm and the first base protrusion side, nor does the first material occupy the entire spacing between the second arm and the second base protrusion side. In one embodiment: 1) the first material within the space between the first arm and the first base side protrusion is spaced back from a distal end of the base protrusion, and is located in a portion of this spacing that is wider than where the first arm interconnects with the base; and 2) the first material within the space between the second arm and the second base side protrusion is spaced back from a distal end of the base protrusion, and is located in a portion of this spacing that is wider than where the second arm interconnects with the base. In another embodiment: 1) the first material within the space between the first arm and the first base side protrusion is spaced back from a distal end of the base protrusion, and is located in a widest portion of this spacing; and 2) the first material within the space between the second arm and the second base side protrusion is spaced back from a distal end of the base protrusion, and is located in a widest portion of this spacing.

A slider may be positioned between the first and second arms of the frame. Typically the slider would be spaced inwardly from each arm, and further would be appropriately interconnected with each arm. This slider may include what is commonly referred to as leading and trailing edges. Generally, the relative airflow during disk drive operations is from the leading edge to the trailing edge of the slider, and typically one or more transducers will be disposed at or near the trailing edge of the slider (e.g., a read/write head). In any case, the leading edge of the slider may be spaced from a distal end of the base protrusion of the frame (again, that portion of the base that is located between the first and second arms), and the leading edge of the slider may be located between the distal end of the base protrusion of the frame and the trailing edge of the slider. Stated another way, the slider may be oriented in the frame such that its leading edge is slightly spaced from a distal end of the base protrusion and the trailing edge of the slider may be disposed more toward the free end of the first and second arms of the frame. In one embodiment, the distance between the leading edge of the slider and distal end of the base protrusion of the frame is less than a widest portion of the spacing between the first arm and the first base protrusion side, and is also less than a widest portion of the spacing between the second arm and the second base protrusion side. In another embodiment, no first material exists within the space between the leading edge of the slider and the distal end of the base protrusion.

Generally, the first and/or second actuating elements may be operated to exert a force on its corresponding arm to change the position of its corresponding arm by deflecting or bending the same (and also change the position of a disk drive slider that may be interconnected with the arms as noted above). The first and second actuating elements may be of any appropriate type, size, shape, and/or configuration. In one embodiment, both the first actuator and second actuating elements are in the form of what may be characterized as a multi-layer piezoelectric element. Although the first and second actuating elements may indeed be the same in all respects, such is not required.

A third aspect of the present invention is directed to a disk drive slider positioner or actuator (e.g., a second stage actuator) that includes a frame, as well as first and second actuators or actuating elements. Sometimes such a positioner or actuator is referred to in the art as a "microactuator." In any case, the frame includes a base and a pair of arms (hereafter first and second arms) that cantilever from the base. The base includes what may be characterized as a "base protrusion" that is located between the first and second arms. The base protrusion is separated from the first and second arms by first and second slots, respectively. The first and second slots are each widest at a distal end of the base protrusion, which is that portion of the base protrusion that is closest to the "free" ends of the first and second arms.

Various refinements exist of the features noted in relation to the third aspect of the present invention. Further features may also be incorporated in the third aspect of the present invention as well. These refinements and additional features may exist individually or in any combination. The characterization of the first and second slots as being "widest" at the end thereof that coincides with the distal end of the base protrusion provides an overflow feature of sorts when positioning the first material within each of these slots. For instance, it may be desirable to completely "fill" a "narrower" portion of the first and second slots, with any excess first material thereafter occupying part of a "wider" portion of the first and second slots. Generally, having the base protrusion spaced inwardly from the first and second arms, respectively, and having the first material in at least part of the first and second slots, should reduce stresses that are concentrated at the interconnection of the first and second arms with the base and should also structurally reinforce the frame.

The first material may be positioned within the first and second slots in any appropriate manner, with the frame in any appropriate position, and at any appropriate time in the fabrication/assembly of a disk drive head-gimbal assembly or the individual components thereof. The discussion of the first material presented above in relation to the first aspect is equally applicable to this third aspect.

Each of the first and second slots may include two or more slots sections of different widths, where each slot section defines a different portion of the length of the corresponding slot. Consider the case were the first and second slots include at least two of such slot sections (first and second slots sections), and where each second slot section ends at a location coinciding with the distal end of the base protrusion. Each first slot section may be of a uniform width, and each second slots section may also be of a uniform width. Although each first slot section may be of the same width, and although each second slot section may also be of the same width, such is not required. In one embodiment, each second slot section is wider than its corresponding first slot section. In one embodiment, each second slot section is at least about twice the width of its corresponding first slot section.

Preferably, the first material does not occupy the entire length of the first and second slots. In one embodiment, the first material within the first slot is spaced back from the distal end of the base protrusion, and the first material within the second slot is also spaced back from the distal end of the base protrusion.

A slider may be positioned between the first and second arms of the frame. Typically the slider would be spaced inwardly from each arm, and further would be appropriately interconnected with each arm. This slider may include what is commonly referred to as leading and trailing edges. Generally, the relative airflow during disk drive operations is from the leading edge to the trailing edge of the slider, and typically one or more transducers will be disposed at or near the trailing edge of the slider (e.g., a read/write head). In any case, the leading edge of the slider may be spaced from a distal end of the base protrusion of the frame (again, that portion of the base that is located between the first and second arms), and the leading edge of the slider may be located between the distal end of the base protrusion of the frame and the trailing edge of the slider. Stated another way, the slider may be oriented in the frame such that its leading edge is slightly spaced from a distal end of the base protrusion and the trailing edge of the slider may be disposed more toward the free end of the first and second arms of the frame. In one embodiment, the distance between the leading edge of the slider and distal end of the base protrusion of the frame is less than a widest portion of the first slot and is less than a widest portion of the second slot. In another embodiment, no first material exists within the space between the leading edge of the slider and the distal end of the base protrusion.

Generally, the first and/or second actuating elements may be operated to exert a force on its corresponding arm to change the position of its corresponding arm by deflecting or bending the same (and also change the position of a disk drive slider that may be interconnected with the arms as noted above). The first and second actuating elements may be of any appropriate type, size, shape, and/or configuration. In one embodiment, both the first actuator and second actuating elements are in the form of what may be characterized as a multi-layer piezoelectric element. Although the first and second actuating elements may indeed be the same in all respects, such is not required.

DETAILED DESCRIPTION OF THE INVENTION

Figure 1:
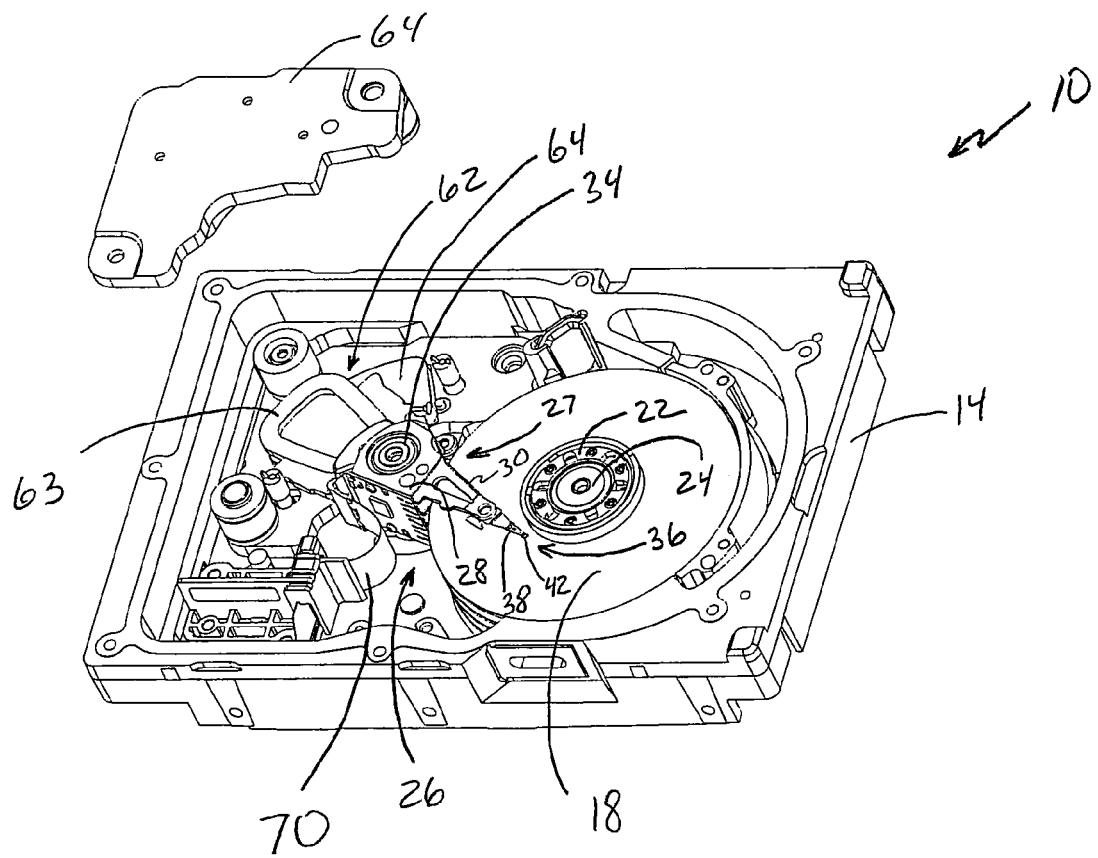
FIG. 1 is a perspective view of a prior art disk drive that may be adapted to incorporate a disk drive slider positioner with an epoxy overflow reservoir, the combination of which is not known to be in the prior art.
Figure 2:
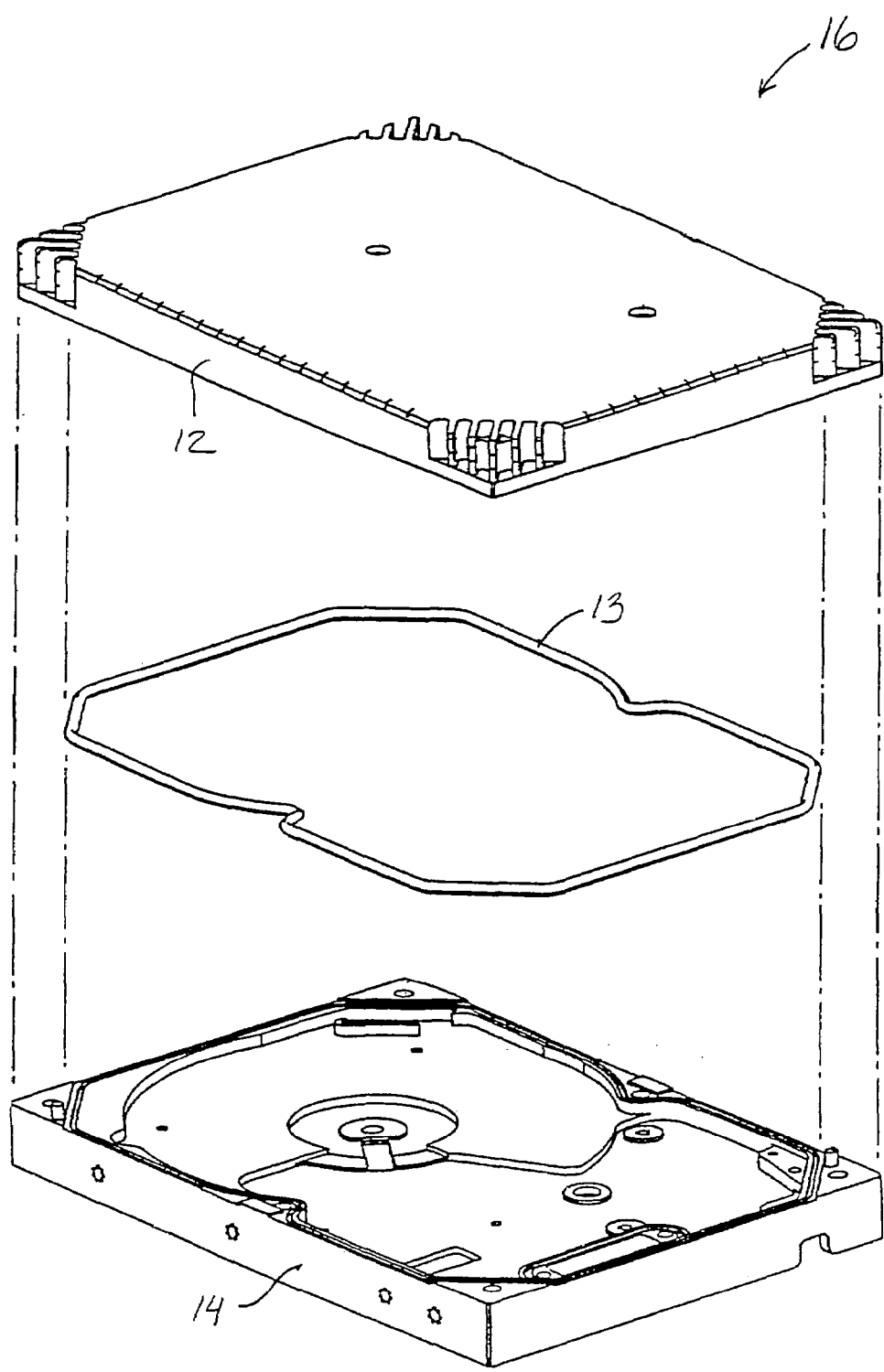
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a disk drive slider positioner with an epoxy overflow reservoir, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. Typically, if the head positioner assembly 26 includes a single actuator arm, it is referred to as a head arm assembly—otherwise, it is referred to as a head stack assembly. Hereafter, the head positioner assembly 26 may be referred to as a head stack assembly 26 based upon the configuration illustrated herein.

The actuator 27 of the head stack assembly 26 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head stack assembly 26 is provided by an appropriate head stack assembly driver, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head stack assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head stack assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
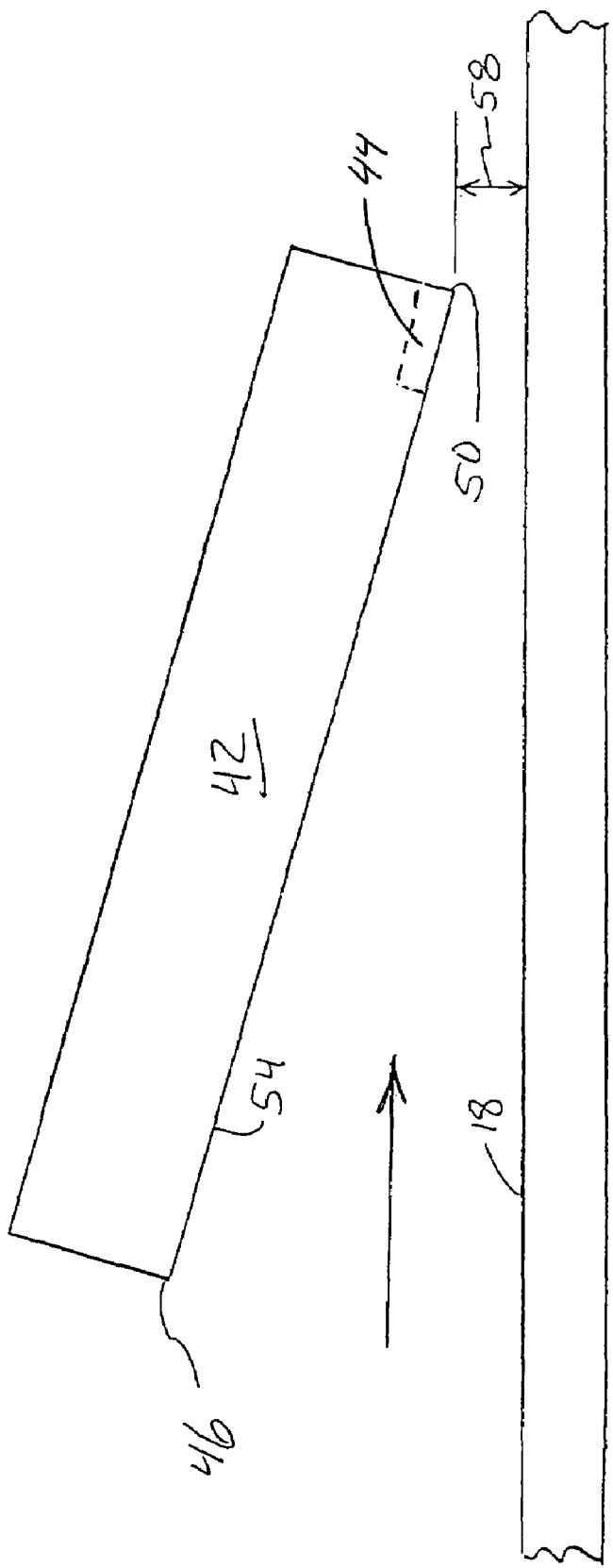
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
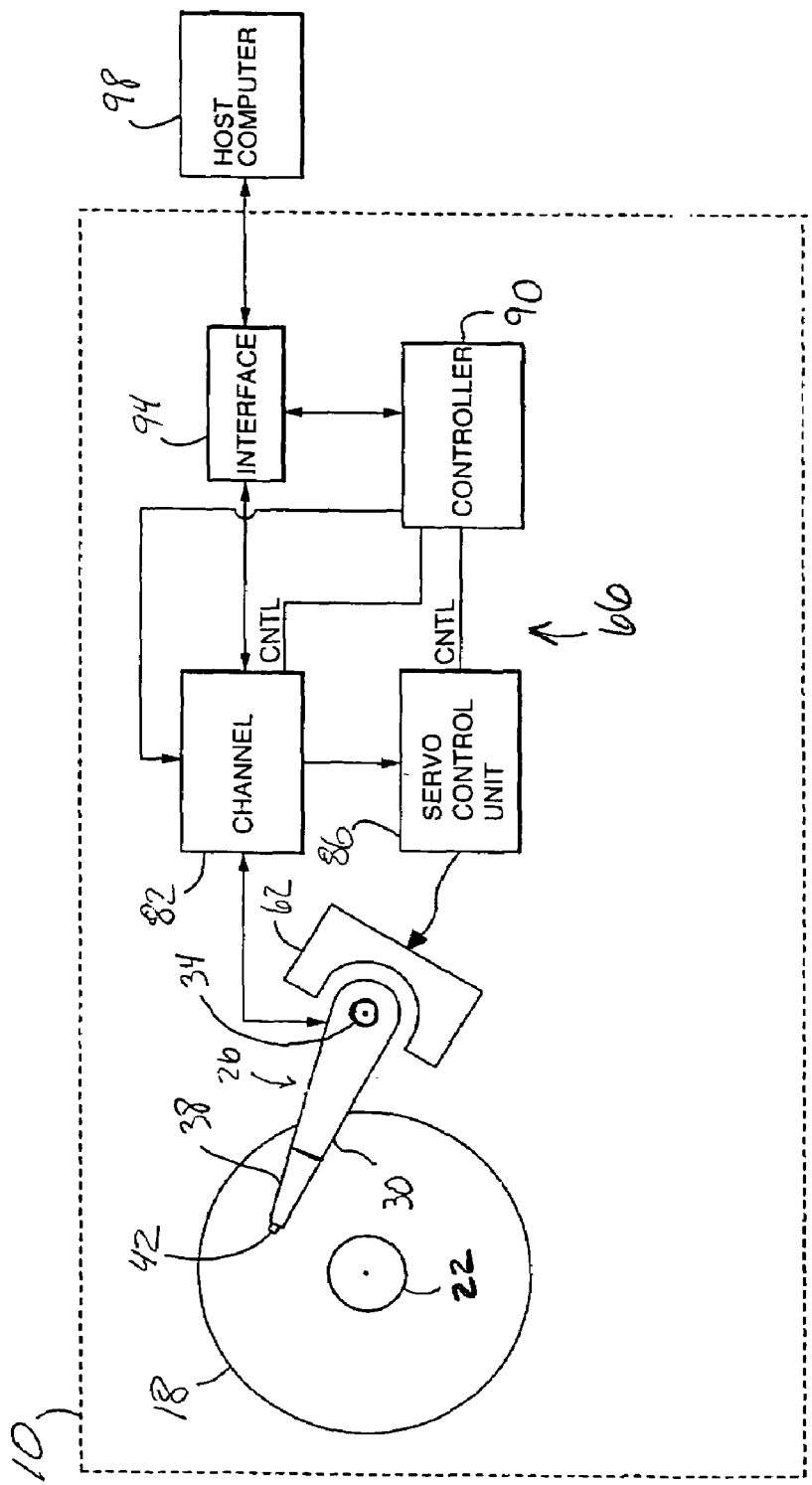
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
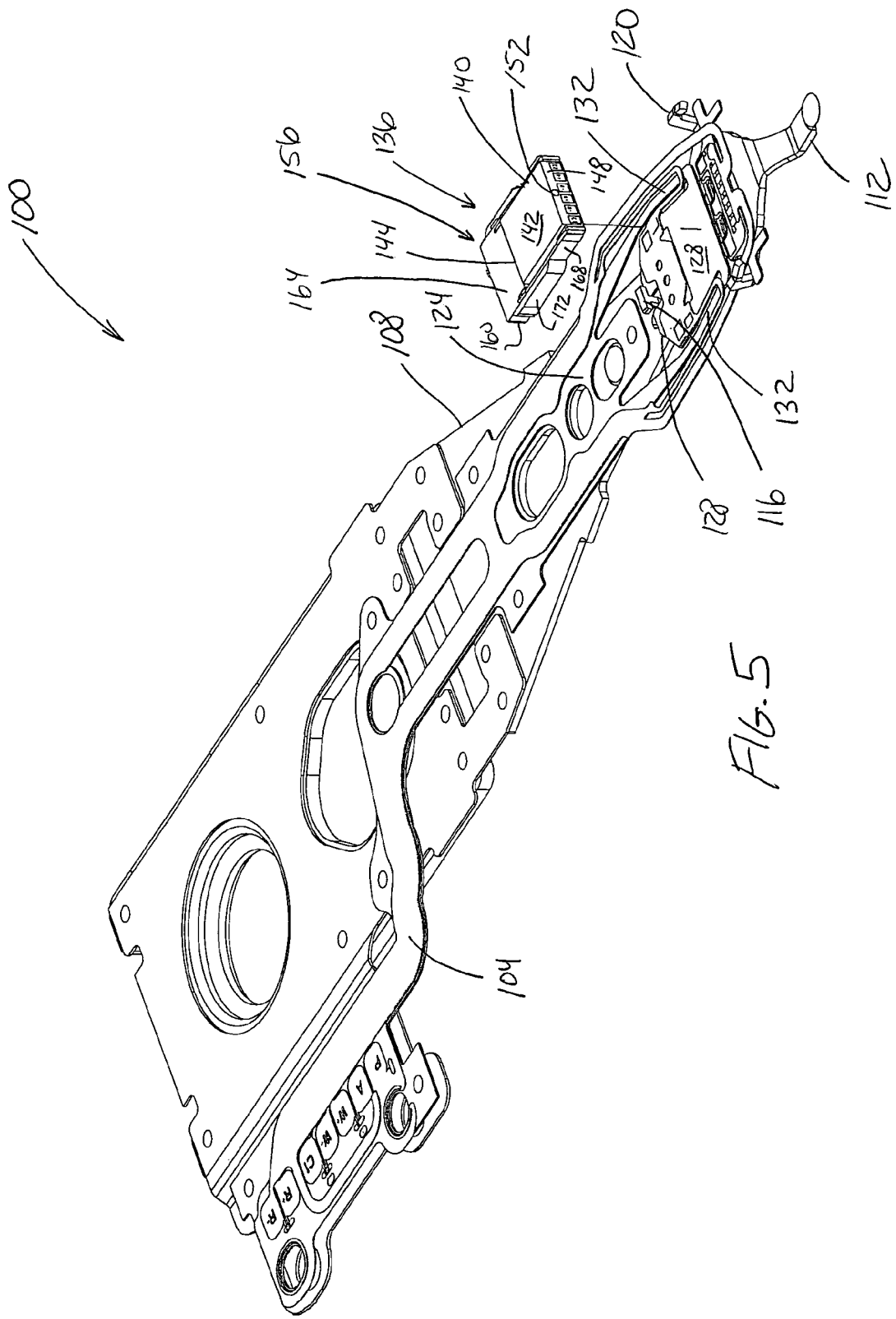
FIG. 5 is a perspective view of a head-gimbal assembly with a prior art microactuator or disk drive slider positioner.

One embodiment of a head-gimbal assembly that may be used in place of the head-gimbal assembly 36 in the disk drive 10 is illustrated in FIG. 5 (or in any other disk drive for that matter) and is identified by reference numeral 100. The head-gimbal assembly 100 generally includes a suspension 108, a flex cable 104, a flexure 124, and a prior art slider assembly 136. The suspension 108, flex cable 104, and flexure 124 may be of any appropriate size, shape, and/or configuration. Generally, the suspension 108 biases the slider assembly 136 toward its corresponding data storage disk; the flexure 124 provides a desired interconnection between the slider assembly 136 and the suspension 108; the flex cable 104 provides electrical signals to and receives electrical signals from the slider assembly 136; and the slider assembly 136 communicates with its corresponding data storage disk.

The flexure 124 is appropriately mounted on the suspension 108 at one or more locations, and includes a pair of deflectable gimbal legs 132 to movably support the slider assembly 136 relative to the suspension 108. In this regard, the flexure 124 further includes a flexure tongue 128 that is supported by the gimbal legs 132. A hinge (not shown) also allows the flexure tongue 124 to pivot/move along a predefined axis relative to the gimbal legs 132. Typically, the hinge axis will be at least generally perpendicular to the long axis of the suspension 108. A dimple or other protrusion (not shown) is included on the suspension 108 and engages the side of the flexure tongue 128 that is opposite the side on which the slider assembly 136 is mounted.

The suspension 108 includes both a leading edge limiter 116 and the trailing edge limiter 120 to establish a maximum displacement of the leading and trailing edges, respectively, of the flexure tongue 124 relative to the suspension 108. The suspension 108 also includes a lift tab 112 for use in parking the head-gimbal assembly 100. Engagement of this lift tab 112 with an appropriate load/unload ramp exerts a force on the suspension 108 to increase the vertical spacing between the slider assembly 136 and its corresponding data storage disk. The leading edge limiter 116 and/or trailing edge limiter 120 of the suspension 108 may engage the flexure 124 at this time, as a suction force may still be "pulling" the slider 140 toward its corresponding data storage disk during the parking operation.

The slider assembly 136 is mounted on the flexure tongue 124 such that the trailing edge of the slider assembly 136 is disposed at or close to the hinge of the flexure tongue 124. An enlarged view of the slider assembly 136 is presented in FIG. 6. There are two main components of the slider assembly 136—a slider 140 and what may be characterized as a microactuator or slider positioner 156 (e.g., a second stage actuator). The slider 140 may be of any appropriate size, shape, and/or configuration. Generally, the slider 140 includes an air bearing surface 142 (the surface of the slider 140 that projects toward its corresponding data storage disk during disk drive operations, and that is contoured to exert forces on the slider 140 to allow it to "fly" above its corresponding data storage disk during disk drive operations, typically in closely spaced relation), a leading edge 144, a trailing edge 148, and a read/write head 152. The fluid (e.g., air) flows relative to the slider 140 from its leading edge 144 to its trailing edge 148 during disk drive operations. The illustrated slider 140 is of the "flying type," and its leading edge 144 will be spaced further from its corresponding data storage disk than its trailing edge 148 during disk drive operations. The leading edge 144 of the slider 140 is allowed to move further away from its corresponding data storage disk than the trailing edge 148 of the slider 140 by a pivoting of the flexure tongue 128 about its hinge.

Figure 6:
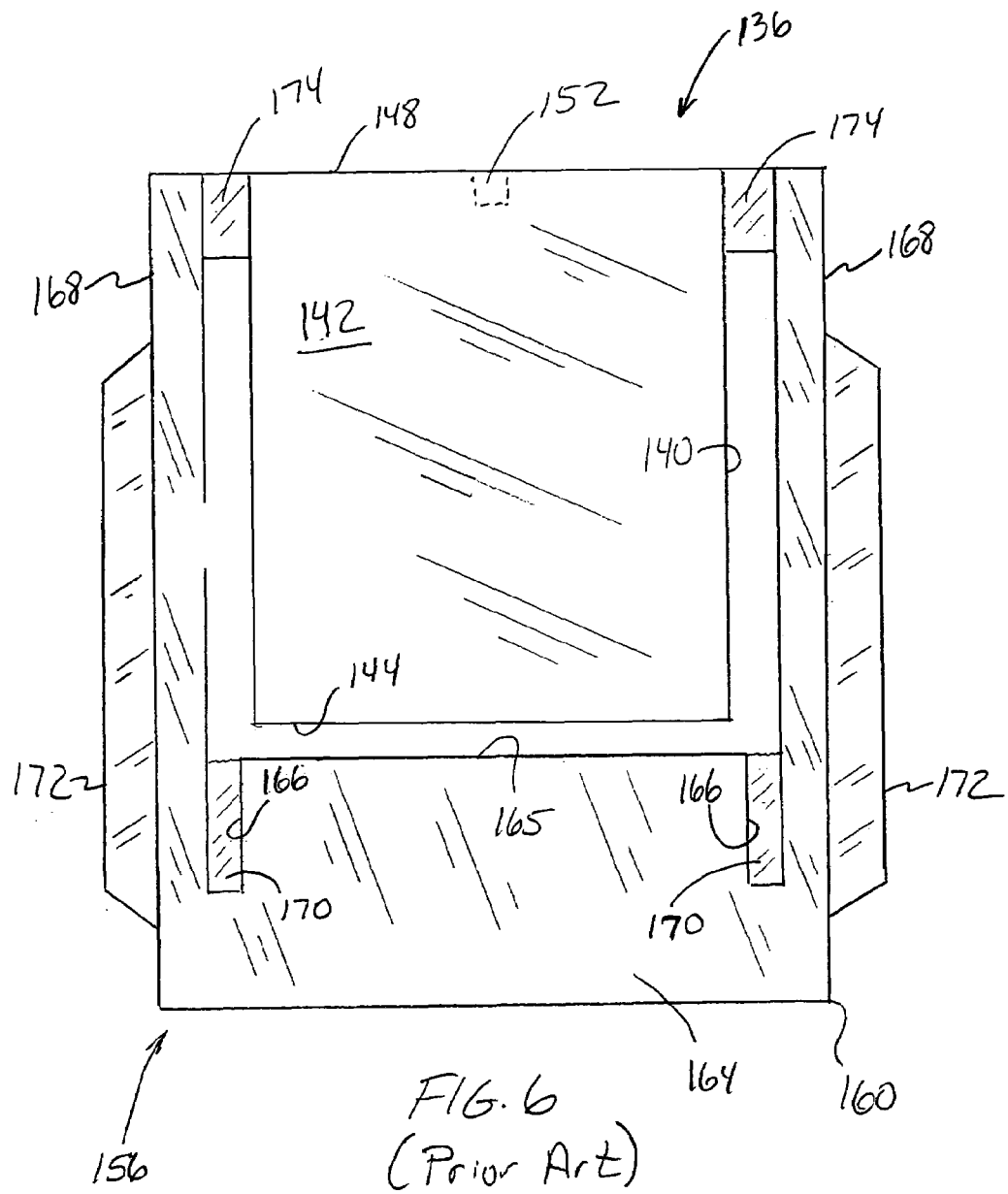
FIG. 6 is a bottom view of the disk drive slider positioner of FIG. 5.

The slider microactuator 156 is used to position the slider 140 (more specifically its read/write head 152) relative to a certain track of the corresponding data storage disk. The slider microactuator 156 is generally in the form of a frame 160 and a pair of actuating elements 172. The frame 160 is appropriately mounted on the flexure tongue 128, and includes a base 164, as well as a pair of arms 168 that are spaced along the base 164 and that each cantilever from the base 164. A pair of slots 166 is formed in the base 164 at the corner between each arm 168 and the base 164. These slots 166 extend completely through the frame 160, and are of a uniform width along their entire length. A first material 170 (e.g., an epoxy or adhesive) is disposed within each of the slots 166 in order to reduce the potential for cracking of the frame 160 at the junction between the arms 168 and the base 164, and also to structurally reinforce the frame 160. Preferably, the first material 170 occupies the entire length of its corresponding slot 166 such that the first material 170 terminates at a distal end 165 of the base 164 as shown in FIG. 6.

Having the first material 170 being spaced back within its corresponding slot 166 from the distal end 165 of the base 164 (an under-filled configuration) may not sufficiently reduce the potential for a cracking of the frame 160 and/or may not provide the desired degree of structural reinforcement of the frame 160. Having the first material 170 extend out of its corresponding slot 166 (an over-filled configuration, where the first material 170 could extend into the space between the distal end 165 of the base 164 and the leading edge 144 of the slider 140) may adversely affect the positioning of the slider 140 relative to the frame 160 and/or the movement of the slider 140 relative to the frame 160.

The slider 140 is positioned within the space collectively defined by the pair of arms 168 and the distal end 165 of the base 164. Typically, there will be a space between the slider 140 and each of the arms 168, as well as a space between the leading edge 144 of the slider 140 and the distal end 165 of the base 164. A first material 174 (e.g., an epoxy or adhesive) is used to fix a portion of the slider 140 to each of the arms 168. This first material 174 is typically disposed toward the free ends of the arms 168.

An actuating element 172 is provided for each of the arms 168 of the frame 160, and each is in the form of what may be characterized as a piezoelectric element (e.g., a plurality of layers of a piezoelectric material, along with appropriate electrodes (signal and ground)). The actuating elements 172 may be operated to exert a force on their corresponding arm 168 to deflect or bend the same relative to the base 164 of the frame 160. This of course changes the position of the slider 140 relative to the frame 160, and more pertinently changes the position of its read/write head 152 relative to its corresponding data storage disk.

Figure 7:
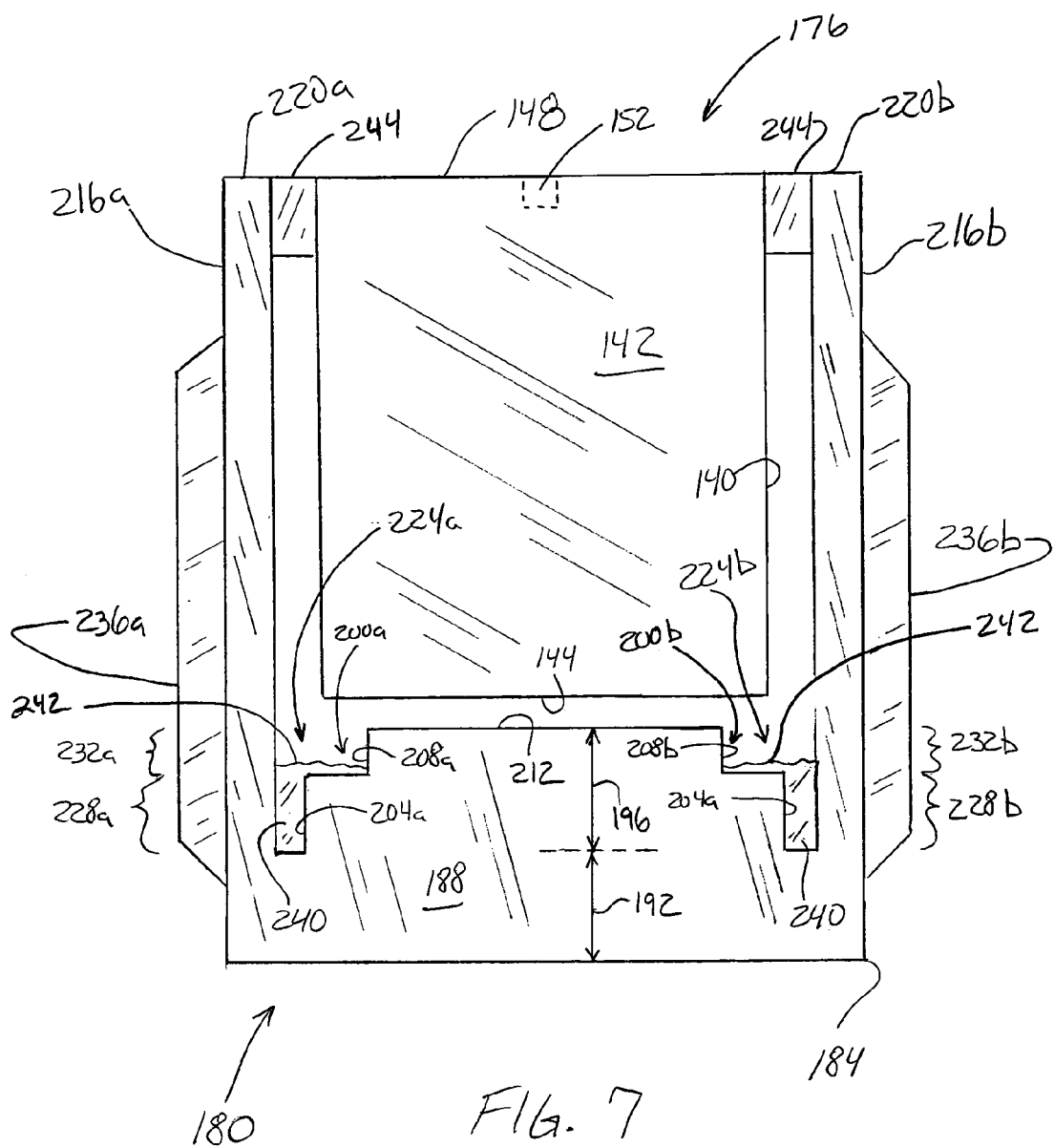
FIG. 7 is a bottom view of one embodiment of a disk drive slider positioner that may be used in place of the disk drive slider positioner of FIGS. 5-6, and that uses a pair of epoxy overflow reservoirs.

One embodiment of a slider assembly 176 that may be used by the head-gimbal assembly 100 (or any other appropriate head-gimbal assembly for that matter) is illustrated in FIG. 7 and is identified by reference numeral 176. The slider assembly 176 uses the above-noted slider 140 (although any appropriate slider may be used by the slider assembly 176) and a microactuator or slider positioner 180 (e.g., a second state actuator). The slider microactuator 180 is generally in the form of a frame 184 and a pair of actuating elements 236. The frame 184 is appropriately mounted on the flexure tongue 128, and includes a base 188, as well as a pair of arms 216a, 216b that are spaced along the base 188 and that each cantilever from the base 188. The arms 216a, 216b thereby have free ends 220a, 220b, respectively.

The slider 140 is positioned within the space collectively defined by the pair of arms 216a, 216b and a distal end 212 of the base 188. Typically, there will be a space between the slider 140 and each of the arms 216a, 216b, as well as a space between the leading edge 144 of the slider 140 and the distal end 212 of the base 188. A first material 244 (e.g., an epoxy or adhesive) is used to fix a portion of the slider 140 to each of the arms 216a, 216b. This first material 244 is typically disposed toward the free ends 220a, 220b of the arms 216a, 216b, and typically occupies only a portion of the spacing between the arms 216a, 216b and the two sides of the slider 140.

An actuating element 236 is provided for each of the arms 216a, 216b of the frame 188, and each is in the form of what may be characterized as a piezoelectric element (e.g., a plurality of layers of a piezoelectric material, along with appropriate electrodes (signal and ground)). However, the actuating elements 236 may be of any appropriate type, size, shape, and/or configuration. The actuating elements 236 may be operated to exert a force on their corresponding arm 216a, 216b to deflect or bend the same relative to the base 188 of the frame 184. This of course changes the position of the slider 140 relative to the frame 184, and more pertinently changes the position of its read/write head 152 relative to its corresponding data storage disk.

The primary difference between the slider microactuator 180 of FIG. 7 and the slider microactuator 156 of FIGS. 5-6 is in relation to the shape of a slot 224a, 224b between the base 188 and the corresponding arms 216a, 216b. Generally, each of these slots 224a, 224b includes an enlarged section for any overflow during the dispensing of a first material 240 into a desired portion of the slot 224a, 224b.

There are a number of ways to describe the slots 224a, 224b. One is in relation to the base 188. In this regard, the base 188 includes what may be characterized as a first base section 192 and a second base section or base protrusion 196. Generally, the arms 216a, 216b extend from the first base section 192, while the base protrusion 196 is that portion of the base 188 that is disposed or located between the arms 216a, 216b. The base protrusion 196 includes the noted distal end 212, as well as a pair of base protrusion sides 200a, 200b that are spaced inwardly from their corresponding arm 216a, 216b.

Each base protrusion side 200a, 200b extends from the first base section 192 to the distal end 212 of the base protrusion 196 and defines one length dimension boundary of its corresponding slot 224a, 224b. The other length dimension boundary of each slot 224a, 224b is defined by the corresponding arm 216a, 216b. Each base protrusion side 200a, 200b includes a corresponding first side section 204a, 204b and a corresponding second side section 208a, 208b. The first side sections 204a, 204b extend from the first base section 192 at least generally in the direction of its corresponding second side section 208a, 208b, while the second side sections 208a, 208b, extend from the distal end 212 at least generally in the direction of the corresponding first side section 204a, 204b. In the illustrated embodiments, the arm 216a, the first side section 204a, and the second side section 208a are disposed in parallel relation, while the arm 216b, the first side section 204b, and the second side section 208b are disposed in parallel relation. However, such need not be the case. What is of importance is that the second side section 208a be spaced further from the arm 216a than its corresponding first side section 204a, that the second side section 208a be disposed or located closer to the distal end 212 than its corresponding first side section 204a, that the second side section 208b be spaced further from the arm 216b than its corresponding first side section 204b, and that the second side section 208b be disposed or located closer to the distal end 212 than its corresponding first side section 204b.

Another way to define the slots 224a, 224b is as including multiple/different length segments of different widths. For instance, the slot 224a may be characterized as including a first slot section 228a and a second slot section 232a that are disposed in end-to-end relation in the illustrated embodiment, although such is not required (e.g., one or more length segments could be disposed therebetween). Both the first slot section 228a and the second slot section 232a each define a portion of the length of the slot 224a. There are a number of characterizations that may be made in relation to the slot 224a: 1) its first slot section 228a is of a uniform width (the spacing between the first arm 216a and a corresponding portion of the first side section 204a of the base protrusion 196) along its length dimension, while its second slot section 232a is of a larger uniform width (the spacing between the first arm 216a and a corresponding portion of the second side section 208a of the base protrusion 196) along its length dimension; 2) its wider second slot section 232a is disposed or located somewhere between its first slot section 228a and the distal end 212 of the base protrusion 196; 3) its wider second slot section 232*a* merges into the space collectively defined by the arms 216*a*, 216*b*, and the base protrusion 196; 4) the slot 224*a* is narrowest at its closed end (defined by the first base section 192, or the slot end that is furthest from the free end 200*a* of the arm 216*a*) and is widest at its open end (coinciding with the location of the distal end 212 of the base protrusion 196, or the slot end that is closest to the free end 200*a* of the arm 216*a*); 5) the width of its second slot section 232*a* may be at least twice the width of the first slot section 228*a*; and 6) the width of the second slot section 232*a* is wider than the spacing between the leading edge 144 of the slider 140 and the distal end 212 of the base protrusion 196.

The slot 224*b* may be the mirror image of the slot 224*a* (e.g., the first slot section 228*a* may be of the same length/width as the first slot section 228*b*, while the second slot section 232*a* may be of the same length/width as the second slot section 232*b*), although such need not be the case. In any case, the characterizations presented above with regard to the slot 224*a* are equally applicable to the slot 224*b*. For instance, the slot 224*b* may be characterized as including a first slot section 228*b* and a second slot section 232*b* that are disposed in end-to-end relation in the illustrated embodiment, although such is not required (e.g., one or more length segments could be disposed therebetween). Both the first slot section 228*b* and the second slot section 232*b* each define a portion of the length of the slot 224*b*. There are a number of characterizations that may be made in relation to the slot 224*b*: 1) its first slot section 228*b* is of a uniform width (the spacing between the first arm 216*b* and a corresponding portion of the first side section 204*b* of the base protrusion 196) along its length dimension, while its second slot section 232*b* is of a larger uniform width (the spacing between the first arm 216*b* and a corresponding portion of the second side section 208*b* of the base protrusion 196) along its length dimension; 2) its wider second slot section 232*b* is disposed or located somewhere between its first slot section 228*b* and the distal end 212 of the base protrusion 196; 3) its wider second slot section 232*b* merges into the space collectively defined by the arms 216*a*, 216*b*, and the base protrusion 196; 4) the slot 224*b* is narrowest at its closed end (defined by the first base section 192, or the slot end that is furthest from the free end 200*b* of the arm 216*b*) and is widest at its open end (coinciding with the location of the distal end 212 of the base protrusion 196, or the slot end that is closest to the free end 200*b* of the arm 216*b*); 5) the width of its second slot section 232*b* may be at least twice the width of the first slot section 228*b*; and 6) the width of the second slot section 232*b* is wider than the spacing between the leading edge 144 of the slider 140 and the distal end 212 of the base protrusion 196.

A certain minimum amount of the first material 240 is disposed within each of the slots 224*a*, 224*b*. This first material 240 may be positioned within the slots 224*a*, 224*b* in any appropriate manner, with the frame 184 in any appropriate position, and at any appropriate time in the fabrication/assembly of a disk drive head-gimbal assembly or the individual components thereof (e.g., before or after fixing the slider 140 to the frame 184). In one embodiment, the frame 184 is disposed such that the arms 216*a*, 216*b* extend in the vertical dimension for dispensing the first material 240 into the slots 216*a*, 216*b*, and prior to fixing the slider 140 to the frame 184.

The function of the first slot sections 228*a*, 228*b* and disposing the first material 240 therewithin is to desirably reduce the stress concentrations associated with the corner between the arms 216*a*, 216*b* and the base 188 of the frame 184. The first material 240 thereby should generally be more pliable than the frame 184, and may in the form of an epoxy or other adhesive materials. Stated another way, the first material 240 should have one or more of the following properties: the ability to bond to the frame 184; a Young's module of elasticity that is less than that of the frame 184; a glass transition temperature that is higher than the normal operating temperature of the disk drive in which the disk drive slider positioner or actuator will be used. The first material 170 discussed above in relation to the slider positioner 156 of FIGS. 5-6 may be in accordance with the first material 240.

The first material 240 preferably occupies the entire length of each first slot section 228*a*, 228*b*. In order to more reliably ensure that this is the case, preferably at least some of the first material 240 extends into the corresponding second slot section 232*a*, 232*b*. In this respect, the second slot sections 232*a*, 232*b* function as an overflow reservoir for their corresponding first slot section 228*a*, 228*b*. However, any first material 240 within either of the second slot sections 232*a*, 232*b* should occupy less than the entire length dimension of the corresponding second slot section 232*a*, 232*b* such that an exposed end 242 of the first material 240 is recessed relative to or spaced back from the distal end 212 of the base protrusion 196. With this being the case, there should not be any first material 240 within the space between the leading edge 144 of the slider 140 and the distal end 212 of the base protrusion 196.

Having the second slot sections 232*a*, 232*b* as an overflow reservoir for when disposing first material 240 within the first slot sections 228*a*, 228*b* is one advantage of the second slot sections 232*a*, 232*b*. Stated another way, the use of the second slot sections 232*a*, 232*b* allows the first material 240 to more reliably occupy the entire length dimension of both first slot sections 228*a*, 228*b*. There may be other advantages associated with the second slot sections 232*a*, 232*b*. For instance, it may be desirable to have the first material 240 in the entirety of both first slot sections 228*a*, 228*b*, but also in only part of both second slot sections 232*a*, 232*b* to further address the stresses associated with the interconnection of the arms 216*a*, 216*b* with the base 188 and/or to further structurally reinforce the frame 184. Other potential advantages of having the wider second slot sections 232*a*, 232*b*, including when having some first material 240 disposed therein, include allowing for the use of less expensive dispensers for the first material 240, and otherwise making the process of dispensing the first material 240 easier.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive slider positioner, comprising:
  a frame comprising a base and first and second arms, wherein said base comprises first and second base sections, wherein said first and second arms are spaced along said first base section and cantilever from said first base section, wherein said second base section is located between said first and second arms and is spaced inwardly from said first and second arms to define first and second slots, respectively, wherein said first and second slots each comprise at least two different widths along a corresponding length dimension of said first and second slots; and a first material within at least part of each of said first and second slots; and first and second actuators associated with said first and second arms, respectively.

2. The disk drive slider positioner of claim 1, wherein said first material is selected from the group consisting of an epoxy and other adhesive materials.

3. The disk drive slider positioner of claim 1, wherein said first and second slots each comprise first and second slot sections that each define part of a corresponding said length dimension of said first and second slots, wherein each said first slot section extends from said first base section to its corresponding said second slot section, and wherein each said second slot section is wider than its corresponding said first slot section.

4. The disk drive slider positioner of claim 3, wherein each said first slot section is of a uniform width, and wherein each said second slot section is of a uniform width.

5. The disk drive slider positioner of claim 3, wherein said first material occupies an entire length of each said first slot section, and wherein any said first material within each said second slot section occupies less than an entire length of said second slot section such that said first material is spaced back from a distal end of said second base section.

6. The disk drive slider positioner of claim 3, wherein said first material occupies an entire length of each said first slot section, and wherein said first material occupies only a portion of a length of each said second slot section such that said first material is spaced back from a distal end of said second base section.

7. The disk drive slider positioner of claim 1, wherein said first and second arms comprise first and second tips, wherein each of said first and second slots are widest at an end thereof that is closest to its corresponding said first and second tip, and wherein each of said first and second slots is narrowest at an end thereof that is furthest from its corresponding said first and second tip.

8. The disk drive slider positioner of claim 1, wherein a slot end of each of said first and second slots that adjoins a space collectively defined by said second base section and said first and second arms is wider than a corresponding opposite slot end.

9. A slider assembly comprising a slider and the disk drive slider positioner of claim 1, wherein said slider is located between and spaced inwardly from each of said first and second arms, wherein said slider comprises leading and trailing edges, wherein said leading edge is spaced from a distal end of said second base section of said frame, wherein said leading edge is located between said trailing edge and said distal end of said second base section of said frame, and wherein said slider is interconnected with a portion of each of said first and second arms.

10. The slider assembly of claim 9, wherein a distance between said leading edge of said slider and said distal end of said second base section of said frame is less than a widest portion of each of said first and second slots.

11. The slider assembly of claim 9, wherein an end of said first material within each of said first and second slots is spaced back from said distal end of said second base section of said frame and is thereby also spaced back from said leading edge of said slider.

12. A disk drive slider positioner, comprising:

a frame comprising a base and first and second arms that each cantilever from said base, wherein said base comprises a base protrusion that is located between said first and second arms and that comprises first and second base protrusion sides, wherein said first base protrusion side comprises first and second side sections that are spaced inwardly from said first arm by first and second distances, respectively, and that each define a different portion of a length dimension of said first base protrusion side, wherein said second base protrusion side comprises third and fourth side sections that are spaced inwardly from said second arm by third and fourth distances, respectively, and that each define a different portion of a length dimension of said second base protrusion side, wherein said first distance is different from said second distance, and wherein said third distance is different from said fourth distance;

a first material within at least part of a space between said first arm and said first base protrusion side and within at least part of a space between said second arm and said second base protrusion side; and first and second actuators associated with said first and second arms, respectively.

13. The disk drive slider positioner of claim 12, wherein said first material is selected from the group consisting of an epoxy and other adhesive materials.

14. The disk drive slider positioner of claim 12, wherein said base protrusion further comprises a distal end that extends between said first and second base protrusion sides, wherein said second side section extends from said distal end to said first side section, wherein said fourth side section extends from said distal end to said third side section, wherein said second distance is greater than said first distance, and wherein said fourth distance is greater than said third distance.

15. The disk drive slider positioner of claim 14, wherein said second distance is at least about twice the magnitude of said first distance, and wherein said fourth distance is at least about twice the magnitude of said third distance.

16. The disk drive slider positioner of claim 14, wherein said first and third distances are at least substantially equal, and wherein said second and fourth distances are at least substantially equal.

17. A slider assembly comprising a slider and the disk drive slider positioner of claim 14, wherein said slider is located between and spaced inwardly from each of said first and second arms, wherein said slider comprises leading and trailing edges, wherein said leading edge is spaced from said distal end of said base protrusion, wherein said leading edge is located between said trailing edge and said distal end of said base protrusion, and wherein said slider is interconnected with a portion of each of said first and second arms.

18. The slider assembly of claim 17, wherein a space between said leading edge of said slider and said distal end of said base protrusion is devoid of any said first material.

19. The slider assembly of claim 17, wherein a distance between said leading edge of said slider and said distal end of said base protrusion is less than each of said second distance and said fourth distance.

20. The slider assembly of claim 17, wherein an end of said first material within said space between said first arm and said first base protrusion side is spaced back from said distal end of said base protrusion and is thereby also spaced back from said leading edge of said slider, wherein an end of said first material within said space between said second arm and said second base protrusion side is spaced back from said distal end of said base protrusion and is thereby also spaced back from said leading edge of said slider.

21. The disk drive slider positioner of claim 14, wherein a space between said first arm and said second side section of said first base protrusion side comprises means for accommodating an overflow of said first material introduced into a space between said first arm and said first side section of said first base protrusion side, wherein a space between said second arm and said fourth side section of said second base protrusion side comprises means for accommodating an overflow of said first material introduced into a space between said second arm and said third side section of said second base protrusion side.

22. A disk drive slider positioner, comprising:
a frame comprising a base and first and second arms that each cantilever from said base, wherein said first and second arms comprise first and second free ends, respectively, wherein said base comprises a base protrusion that is located between said first and second arms, that comprises a distal end that is a portion of said base protrusion that is closest to said first and second free ends, and that is separated from said first and second arms by first and second slots, respectively, wherein said first and second slots are each widest at said distal end of said base protrusion;
a first material within at least part of each of said first and second slots; and
first and second actuators associated with said first and second arms, respectively.

23. The disk drive slider positioner of claim 22, wherein said first material is selected from the group consisting of an epoxy and other adhesive materials.

24. The disk drive slider positioner of claim 22, wherein said first and second slots each comprise first and second slot sections that each define part of a corresponding length dimension of said first and second slots, wherein each said second slot section ends at said distal end of said base protrusion, and wherein each said second slot section is wider than its corresponding said first slot section.

25. The disk drive slider positioner of claim 24, wherein each said first slot section is of a uniform width, and wherein each said second slot section is of a uniform width.

26. The disk drive slider positioner of claim 24, wherein said first material occupies an entire length of each said first slot section, and wherein any said first material within each said second slot section occupies less than an entire length of said second slot section such that said first material is spaced back from said distal end of said base protrusion.

27. The disk drive slider positioner of claim 24, wherein said first material occupies an entire length of each said first slot section, and wherein said first material occupies only a portion of a length of each said second slot section such that said first material is spaced back from said distal end of said base protrusion.

28. A slider assembly comprising a slider and the disk drive slider positioner of claim 22, wherein said slider is located between and spaced inwardly from each of said first and second arms, wherein said slider comprises leading and trailing edges, wherein said leading edge is spaced from said first distal end of said base protrusion, wherein said leading edge is located between said trailing edge and said distal end of said base protrusion, and wherein said slider is interconnected with a portion of each of said first and second arms.

29. The slider assembly of claim 28, wherein a distance between said leading edge of said slider and said distal end of said base protrusion is less than a width of said first and second slots at said distal end of said base protrusion.

30. The slider assembly of claim 28, wherein an end of said first material within each of said first and second slots is spaced back from said distal end of said base protrusion and is thereby also spaced back from said leading edge of said slider.

* * * * *

UNITED STATES PATENT AND TRADEMARK OFFICE
CERTIFICATE OF CORRECTION

PATENT NO. : 7,612,968 B1
APPLICATION NO. : 11/230215
DATED : November 3, 2009
INVENTOR(S) : Guo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Nineteenth Day of October, 2010

David J. Kappos
*Director of the United States Patent and Trademark Office*